US010711536B2

(12) United States Patent
Dusterhoft et al.

(10) Patent No.: US 10,711,536 B2
(45) Date of Patent: Jul. 14, 2020

(54) SELECTIVE STIMULATION OF RESERVOIR TARGETS

(71) Applicant: Halliburton Energy Services, Inc., Houston, TX (US)

(72) Inventors: Ronald G. Dusterhoft, Katy, TX (US); Stewart Hampton Fowler, Jr., Spring, TX (US); Scott Robert Greig, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 189 days.

(21) Appl. No.: 15/758,300

(22) PCT Filed: Sep. 29, 2015

(86) PCT No.: PCT/US2015/052902
§ 371 (c)(1),
(2) Date: Mar. 7, 2018

(87) PCT Pub. No.: WO2017/058166
PCT Pub. Date: Apr. 6, 2017

(65) Prior Publication Data
US 2018/0252057 A1 Sep. 6, 2018

(51) Int. Cl.
*E21B 17/20* (2006.01)
*E21B 43/26* (2006.01)
(Continued)

(52) U.S. Cl.
CPC ............ *E21B 17/206* (2013.01); *E21B 34/06* (2013.01); *E21B 43/26* (2013.01); *E21B 47/06* (2013.01);
(Continued)

(58) Field of Classification Search
CPC ........ E21B 47/06; E21B 47/101; E21B 34/06; E21B 43/25; E21B 43/26; E21B 43/114; E21B 43/116; E21B 43/117
See application file for complete search history.

(56) References Cited

U.S. PATENT DOCUMENTS

| 4,605,074 A | 8/1986 | Barfield |
| 5,287,741 A * | 2/1994 | Schultz ................. E21B 49/088 |
| | | 166/250.17 |

(Continued)

FOREIGN PATENT DOCUMENTS

WO     2013173404 A1    11/2013

OTHER PUBLICATIONS

International Search and Written Opinion dated Jun. 23, 2016 for PCT Application No. PCT/US2015/052902 filed on Sep. 29, 2015. 17 pages.

(Continued)

*Primary Examiner* — David Carroll
(74) *Attorney, Agent, or Firm* — Chamberlain Hrdlicka (57) ABSTRACT

A selective stimulation system includes coiled tubing in which a distributed sensor array is disposed. The distributed sensor array is to measure hydrocarbon production parameters along the distributed sensor array in a wellbore of a formation. A selective fracturing apparatus is coupled to the coiled tubing. The selective fracturing apparatus is to fracture selected areas of the wellbore. A controller is coupled to the distributed sensor array and controls operation of the selective fracturing apparatus based on the measured hydrocarbon production parameters.

19 Claims, 8 Drawing Sheets

(51) Int. Cl.
G06F 9/455 (2018.01)
E21B 34/06 (2006.01)
E21B 47/06 (2012.01)
E21B 47/10 (2012.01)
E21B 34/00 (2006.01)

(52) U.S. Cl.
CPC ............ *E21B 47/101* (2013.01); *G06F 9/455* (2013.01); *E21B 2034/002* (2013.01)

(56) References Cited

U.S. PATENT DOCUMENTS

| | | | | |
|---|---|---|---|---|
| 2006/0289172 | A1* | 12/2006 | Miller | E21B 23/01 166/382 |
| 2009/0250211 | A1* | 10/2009 | Craig | E21B 43/26 166/250.16 |
| 2012/0186816 | A1* | 7/2012 | Dirksen | E21B 7/208 166/297 |
| 2013/0056197 | A1* | 3/2013 | Maida | E21B 47/123 166/250.01 |
| 2014/0191120 | A1 | 7/2014 | Donderici et al. | |
| 2015/0369023 | A1* | 12/2015 | MacPhail | E21B 43/12 166/269 |

OTHER PUBLICATIONS

Loyd East, Ron Willett, Jim Surjaatmadja, B.W. McDaniel; Application of New Fracturing Technique Improves Stimulation Success for Openhole Horizontal Completions; Document No. SPE-86480-MS; Published by Society of Petroleum Engineers; Source: SPE International Symposium and Exhibition on Formation Damage Control, Feb. 18-20, Lafayette, Louisiana; Publication Date: 2004.

Loyd E. East, Jr., William Grieser, B.W. McDaniel, Bill Johnson, Randy Jackson, Kevin Fisher; Successful Application of Hydrajet Fracturing on Horizontal Wells Completed in a Thick Shale Reservoir; Document No. SPE-91435-MS; Published by: Society of Petroleum Engineers; Source: SPE Eastern Regional Meeting, Sep. 15-17, Charleston, West Virginia ; Publication Date: 2004.

B.W. McDaniel, Ron Willett, Loyd East, Jeff Rosato, Jim Surjaatmadja; Coiled-Tubing Deployment of Hydrajet-Fracturing Technique Enhances Safety and Flexibility, Reduces Job Time; Document No. SPE-90543-MS; Published by: Society of Petroleum Engineers; Source: SPE Annual Technical Conference and Exhibition, Sep. 26-29, Houston, Texas; Publication Date: 2004.

Bill W. McDaniel, Eric Jonathan Marshall, Loyd E. East, Jim Basuki Surjaatmadja; CT-Deployed Hydrajet Perforating in Horizontal Completions Provides New Approaches to Multi-Stage Hydraulic Fracturing Applications; Document No. SPE-100157-MS; Published by: Society of Petroleum Engineers; Source: SPE/ICoTA Coiled Tubing Conference & Exhibition, Apr. 4-5, The Woodlands, Texas, USA; Publication Date: 2006.

Bill W. McDaniel, Jim Basuki Surjaatmadja; Hydrajetting Applications in Horizontal Completions to Improve Hydraulic Fracturing Stimulations and Improve ROI; Document No. SPE-125944-MS; Published by:Society of Petroleum Engineers; Source: SPE Eastern Regional Meeting, Sep. 23-25, Charleston, West Virginia, USA; Published Date: 2009.

Billy W. McDaniel; Philippe Quero; Offshore Low-Moderate Perm Oil Plays Need Rigless Multifracture Stimulation Completion Plan; Document No. SPE-143791-MS; Published by: Society of Petroleum Engineers; Source: Brasil Offshore, Jun. 14-17, Macaé, Brazil; Published Date: 2011.

Gustavo Antonio Ugueto, Paul Thomas Huckabee, Mathieu M. Molenaar; Challenging Assumptions About Fracture Stimulation Placement Effectiveness Using Fiber Optic Distributed Sensing Diagnostics: Diversion, Stage Isolation and Overflushing; Document No. SPE-173348-MS; Published by: Society of Petroleum Engineers; Source: SPE Hydraulic Fracturing Technology Conference, Feb. 3-5, The Woodlands, Texas, USA; Published Date: 2015.

Loyd E. East, Michael Brent Bailey, Billy W. McDaniel, Hydra-Jet Perforating and Proppant Plug Diversio in Multi-Interval Horizontal Well Fracture Stimulation, Case Histories, document No. SPE-114881-MS, published by: Society of Petroleum Engineers, Source: SPE Tight Gas Completions Conference in San Antonio, Texas, USA, ine Jun. 2008, pp. 9-11.

Chris Carpenter, Fracture-Stimulation Placement With Fiber-Optic Distributed-Sensing Diagnostics, document No. SPE-0915-0134, published by JPT Technology in Sep. 2015, pp. 1-2.

Jim B. Surjaatmadja, B.W. McDaniel, Alick Cheng, Keith Rispler, Matthew J. Rees, and Abe Khallad, Successful Acid Treatments in Horizontal Openholes Using Dynamic Diversion and Instant Response Downhole Mixing—An In-Depth Postjob Evaluation, document No. SPE 75522, published by: Socie of Petroleum Engineers, Source: SPE Gas Technology Symposium held in Calgary, Alberta, Canada, Apr. 30-May 2, 2002, pp. 1-11.

Jim B. Surjaatmadja, B.W. McDaniel, Alick Cheng, Keith Rispler, Matthew J. Rees, and Abe Khallad, Successful Acid Treatments in Horizontal Openholes Using Dynamic Diversion and Downhole Mixing—An In-Depth Postjob Evaluation, document No. SPE 75221, published by: Society of Petroleum Engineers, Source: SPE/DOE Improved Oil Recovery Symposium held in Tulsa, Oklahoma, Apr. 13-17, 2002, pp. 1-10.

* cited by examiner

SELECTIVE STIMULATION OF RESERVOIR TARGETS

BACKGROUND

In shale reservoirs, the reservoir matrix permeability is so low that hydraulic fracturing or some other form of reservoir stimulation is used to enable economic production of hydrocarbons from a wellbore. Due to perceived risk and cost, production logging to more rigorously evaluate inflow performance along the full length of the wellbore is not a common operation. The production logging may be carried out using wireline tools and a down hole tractor device to transport the logging tools into a horizontal portion of the wellbore. Wellbore obstructions may result in the tools becoming stuck, thus resulting in unexpected production losses and workover operations to remove the stuck logging tools.

DETAILED DESCRIPTION

Some of the challenges noted above, as well as others, may be addressed by production logging using a distributed sensor array (e.g., fiber optic) equipped coiled tubing to more precisely identify underperforming portions (i.e., targeted zones) of a reservoir. The targeted zones may then be selectively fractured to stimulate only the underperforming portions of the reservoir along the wellbore. This may be accomplished in a single, continuous coiled tubing operation.

FIGS. 1-5 are diagrams of steps of a coiled tubing operation in a wellbore, according to various aspects of the disclosure. The coiled tubing, as used herein, refers to a relatively long, continuous metal pipe 100, typically having a diameter in a range of 1-3.5 inches, that is spooled on a reel 101. The coiled tubing 100 provides the ability to pump fluids through the tubing 100 and the tubing may be pushed into the wellbore rather than relying on gravity.

The tubing 100 includes a distributed sensor array 110 (e.g., multi-function fiber optic) deployed within the tubing 100. While subsequent discussion refers to the sensor array 110 as being a fiber optic sensor array, other types of distributed sensor arrays may be used. The distributed sensor array 110 provides localized measurement of pressure, temperature, fluid flow, and other hydrocarbon production parameters within the borehole.

In the case of the fiber optic distributed sensor array 110, interferometric methods may be used based on a phase shift of the light pulse as a function of the quantity to be measured (e.g., electric or magnetic fields, acoustic vibrations, gravity, fluid or sand flow). The phase information can typically be extracted via mixing the phase shifted signal with a reference signal. In a fiber optic sensor, the interrogation beam and the reference beam may both be derived from the same beam using a beam splitter or optical coupler.

Figure 6:
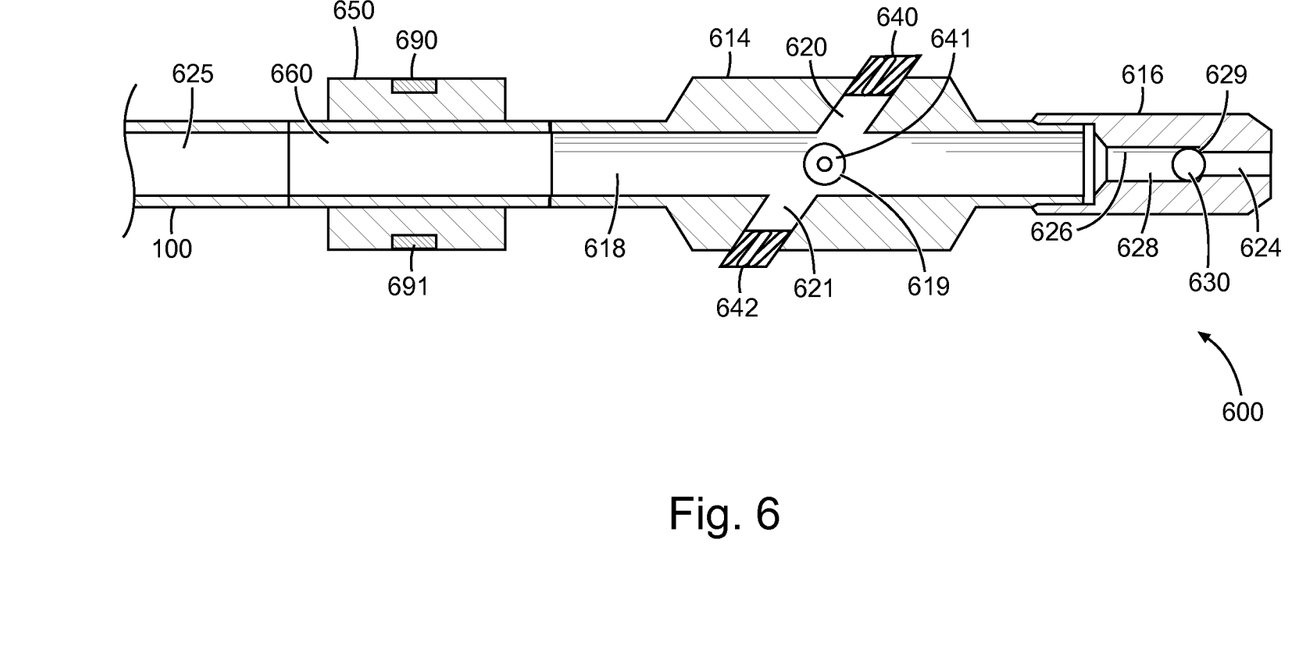
FIG. 6 is a cross-sectional diagram showing a bottom hole assembly, according to various aspects of the disclosure.

A bottom hole assembly (BHA) 600 is coupled to an end of the tubing 100. The BHA 600 may include real time bottom hole pressure gauges, for measuring pressure inside and outside of the BHA 600 for well preparation, stimulation execution, and post stimulation activities within the wellbore. The BHA 600 may further include a hydrajet tool apparatus for selectively fracturing or perforating the wellbore. An example of one such BHA 600 is illustrated in FIG. 6 and discussed subsequently.

Figure 1:
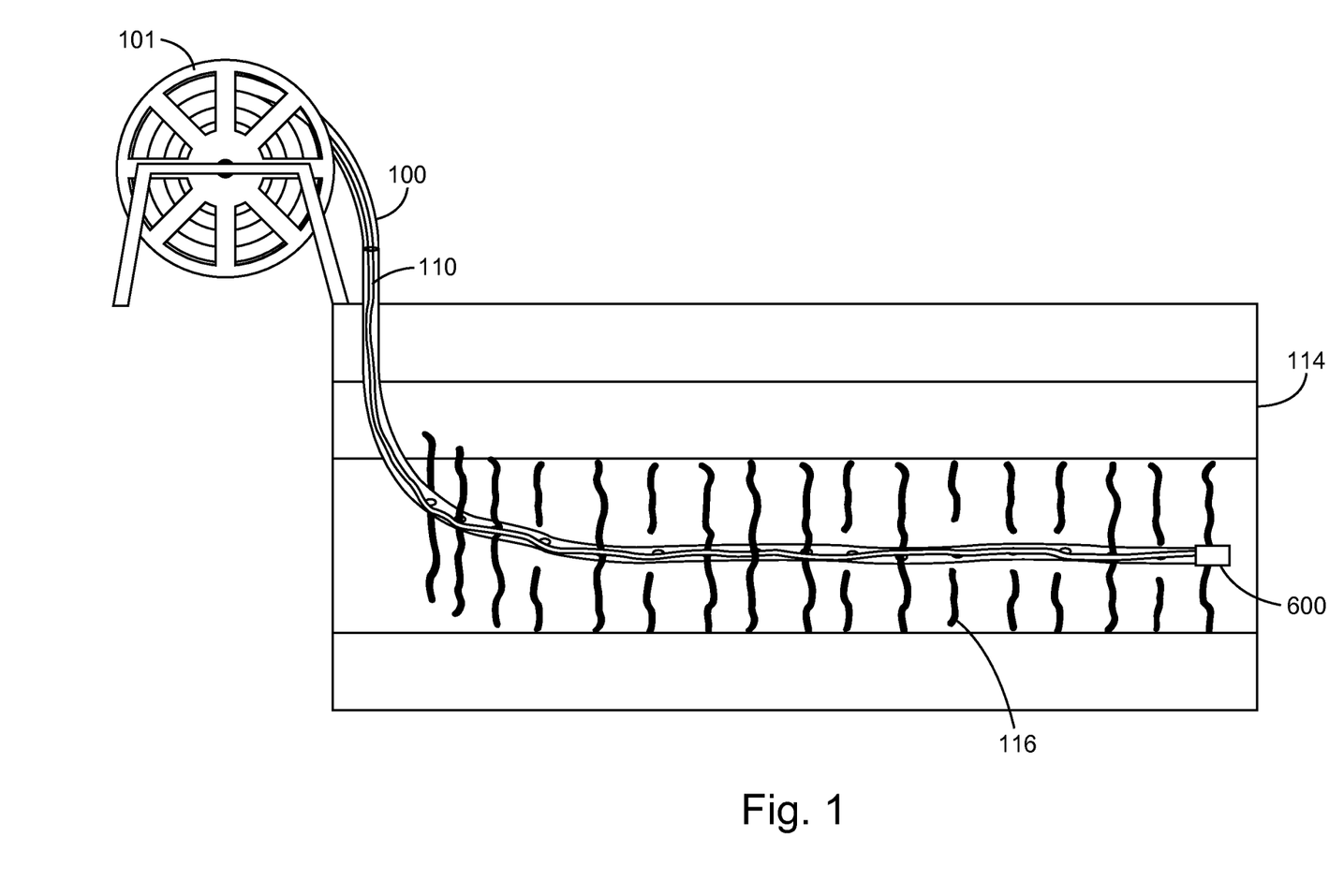
FIGS. 1-5 are diagrams of steps of a coiled tubing operation in a wellbore, according to various aspects of the disclosure.

FIG. 1 is a diagram of a first step of the coiled tubing operation in the wellbore, according to various aspects of the disclosure. The coiled tubing 100, with the attached BHA 600 and integral distributed sensor array 110, is inserted into the wellbore that is drilled through a geological formation 114. The BHA 600 may be initially placed near the toe of the well. The diagram illustrates a plurality of fractures 116 in the formation 114 that may be producing hydrocarbons.

This initial step includes a wellbore clean out to remove solids or fill that may have accumulated in the wellbore during production of the well. The cleaning operation may be done using a normal circulation (i.e., down the tubing and up the annulus) or with a reverse circulation (i.e., down the annulus and up the tubing). This initial step may be underbalanced using a compressed gas (e.g., nitrogen) to lighten the hydrostatic column.

Figure 2:
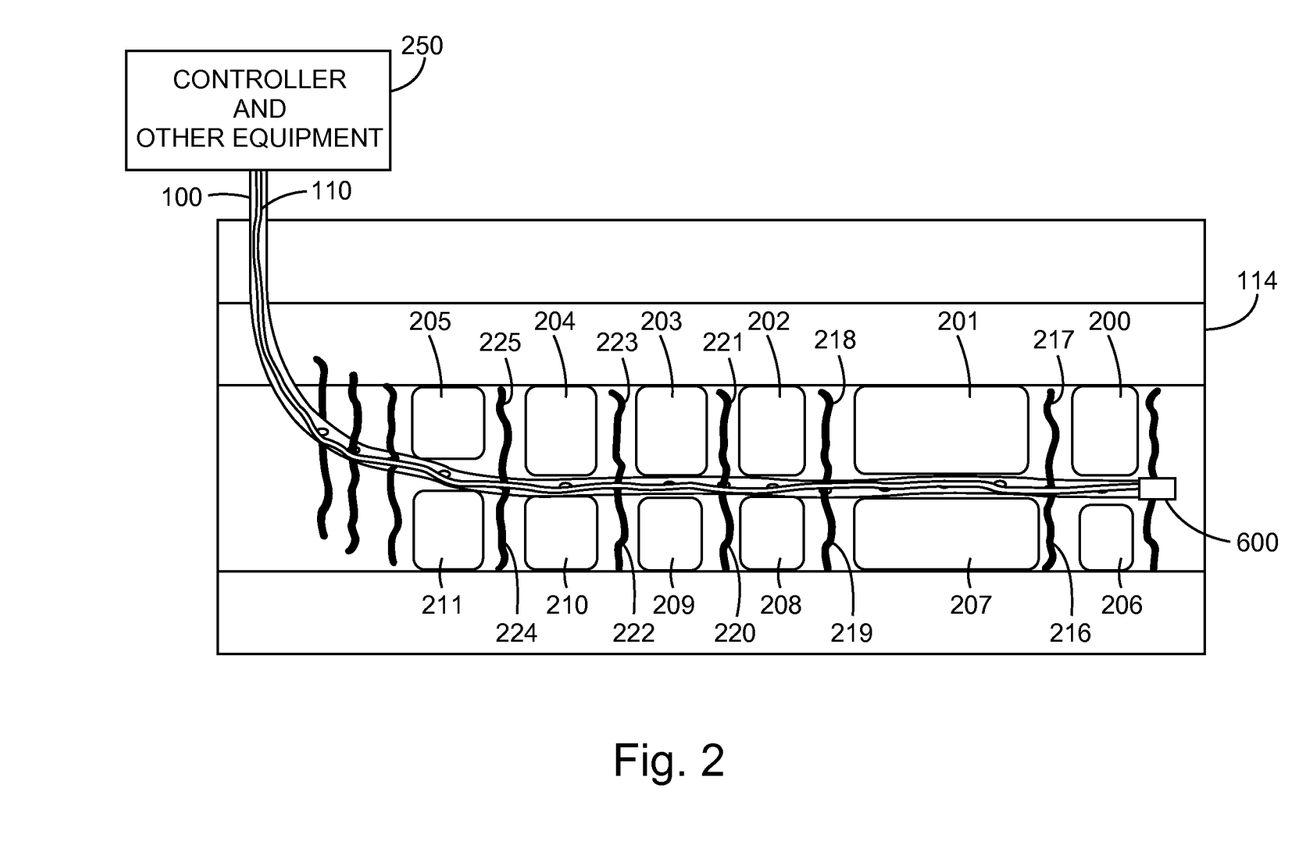

FIG. 2 is a diagram of another step of the coiled tubing operation in the wellbore, according to various aspects of the disclosure. The BHA 600 is held in this position while the well is producing hydrocarbons in order to assess which zones in the formation 114 are contributing to production and which zones are not contributing to production.

The formation 114 of FIG. 2 shows a plurality of fractures 216-225 (i.e., producing zones) that are producing. A plurality of non-producing zones 200-211 are also illustrated.

In order to determine which zones are producing and which zones are not producing, the distributed sensor array 110 in the tubing 100 is used to measure the distributed hydrocarbon production parameters, including temperature, acoustic signatures, and/or bottom hole pressures, in zones along the wellbore. These measurements are communicated to a controller 250 on the surface for analysis.

Figure 8:
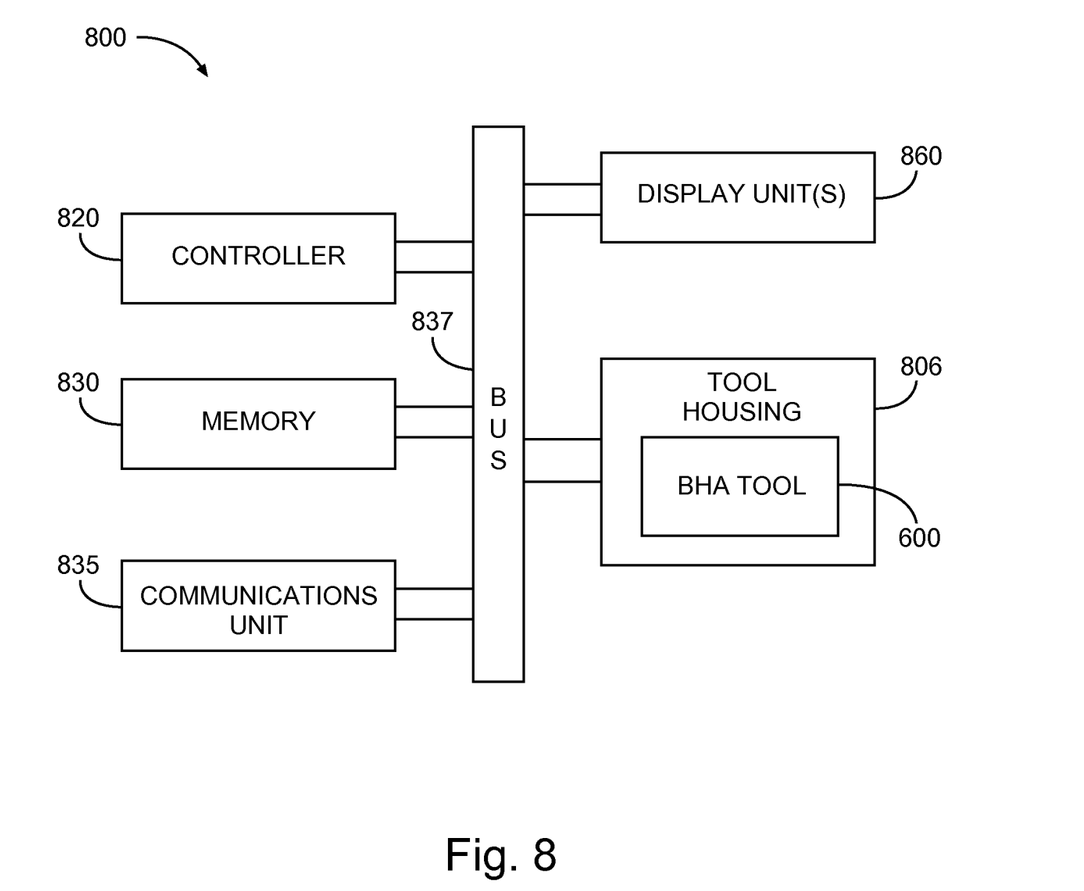
FIG. 8 is a block diagram of an example system operable to implement the activities of multiple methods, according to various aspects of the disclosure.

The controller and other equipment 250 may be considered to be part of the coiled tubing system (e.g., controller 250, coiled tubing 100, distributed sensor array 110). One example of a controller 250 is illustrated in FIG. 8 and described subsequently. The equipment may include the reel 101 illustrated in FIG. 1 or some other equipment that is configured to move the coiled tubing 100 with integral distributed sensor array 110 through the wellbore.

For example, if a fiber optic distributed sensor array 110 is used, the controller 250 may determine the production results of the current well by the phase change between light pulses and a reference light signal. The phase change in the light is indicative of the temperature, acoustic signature, and/or bottom hole pressures at various locations along the wellbore. Greater temperature, pressure, and/or acoustic signature in one location may be indicative of a producing zone as compared to another zone having a lower temperature, pressure, and/or acoustic signal.

As only one illustration of a fiber optic distributed sensor array operation, a series of optical pulses having a selected frequency pattern may be transmitted into a sensing fiber. The phenomenon of Rayleigh backscattering results in some fraction of the light input into the fiber being reflected back to the source where it may be detected in order to provide an output signal that is representative of acoustic disturbances in the vicinity of the fiber.

The source may comprise at least one laser and at least one optical modulator for producing the series of optical pulses separated by a known optical frequency difference. The source may also include at least one photodetector arranged to detect radiation that is Rayleigh backscattered from the intrinsic scattering sites within the fiber.

The signal from the photodetector may be processed by a signal processor to demodulate the returned signal based on a frequency difference between the transmitted optical pulses and the received radiation. The signal processor may also apply a phase unwrap algorithm. The phase of the backscattered light from various sections of the optical fiber may thus be monitored. Any changes in the effective optical path length within a given section of fiber, such as would be due to incident pressure waves causing strain on the fiber, may thus be detected.

The controller 250 compares the current production results to logging data from the initial well production results. The comparison may provide locations for the best reservoir targets for subsequent re-fracturing operations. For example, the current production results may provide indications of locations in the wellbore of the zones 200-211 that are not currently producing.

Figure 3:
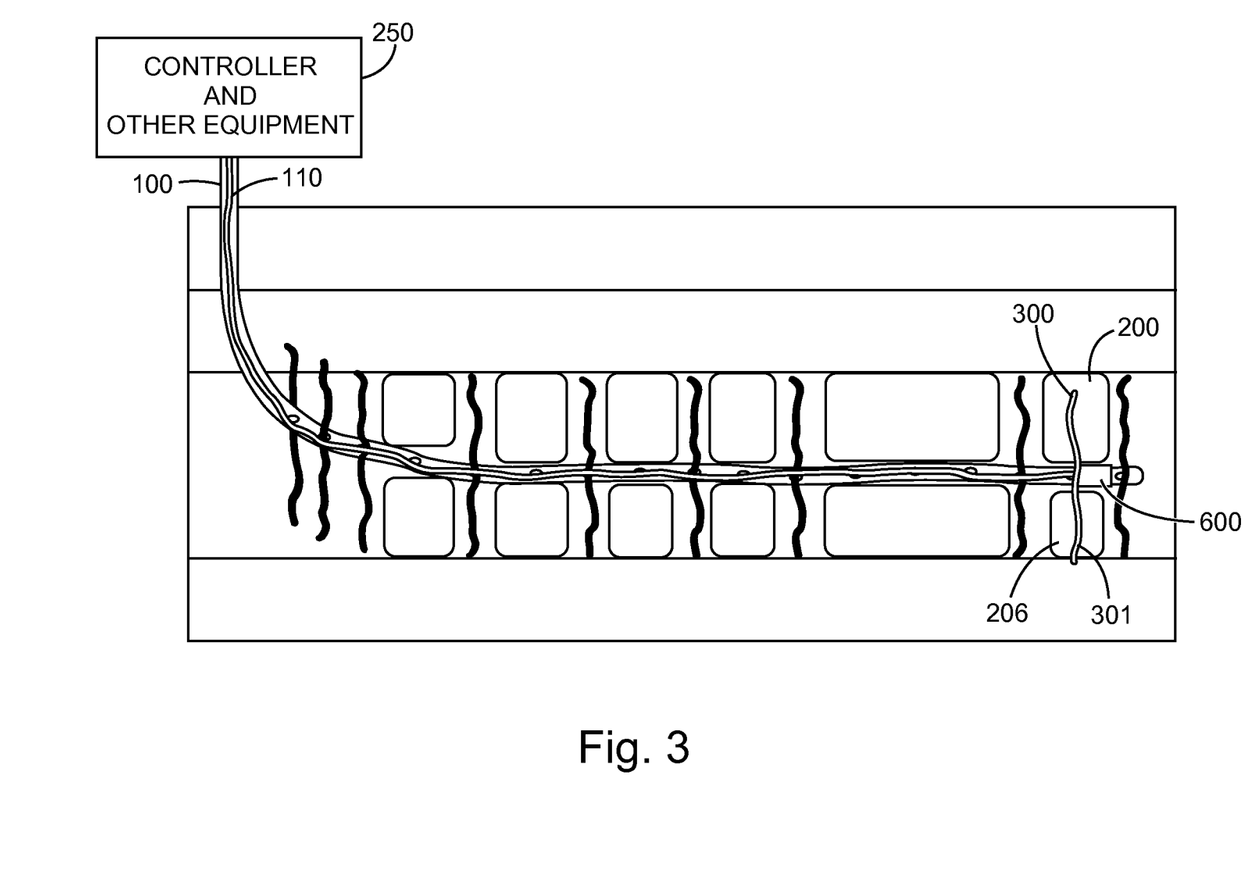

FIG. 3 is a diagram of another step of the coiled tubing operation in the wellbore, according to various aspects of the disclosure. The controller and other equipment 250 on the surface pulls the coiled tubing 100 with distributed sensor 110 so that the attached BHA 600 is moved to a selected location (e.g., low or non-producing zone) as indicated by the differences between the current production results and the initial well production results. The BHA 600, comprising a hydrajet tool apparatus 614 (see FIG. 6), provides perforating or re-fracturing 300, 301 of the non-producing zone 200, 206 at the selected locations.

While the selective re-fracturing is being performed by the hydrajet tool apparatus 614 in this and subsequent re-fracturing steps, a positive pressure may be maintained in the annulus between the coiled tubing 100 and the sides of the wellbore. The positive pressure in the annulus may be maintained by pumping fluid (e.g., water or brine, gelled water or brine commonly used for hydraulic fracture stimulation operations, nitrogen, carbon dioxide or water/brine commingled with nitrogen or carbon dioxide to achieve a desired hydrostatic pressure column in the annulus. This fluid may also include fluid loss material designed to bridge or temporarily plug any flow into the matrix and minimize fluid losses potential lower pressured thief zones above the interval being stimulated. Such material may include graded material such as polylactic acid which will degrade over time when exposed to water to minimize risk of permanently damaging potentially productive intervals.) into the annulus from the surface.

Figure 4:
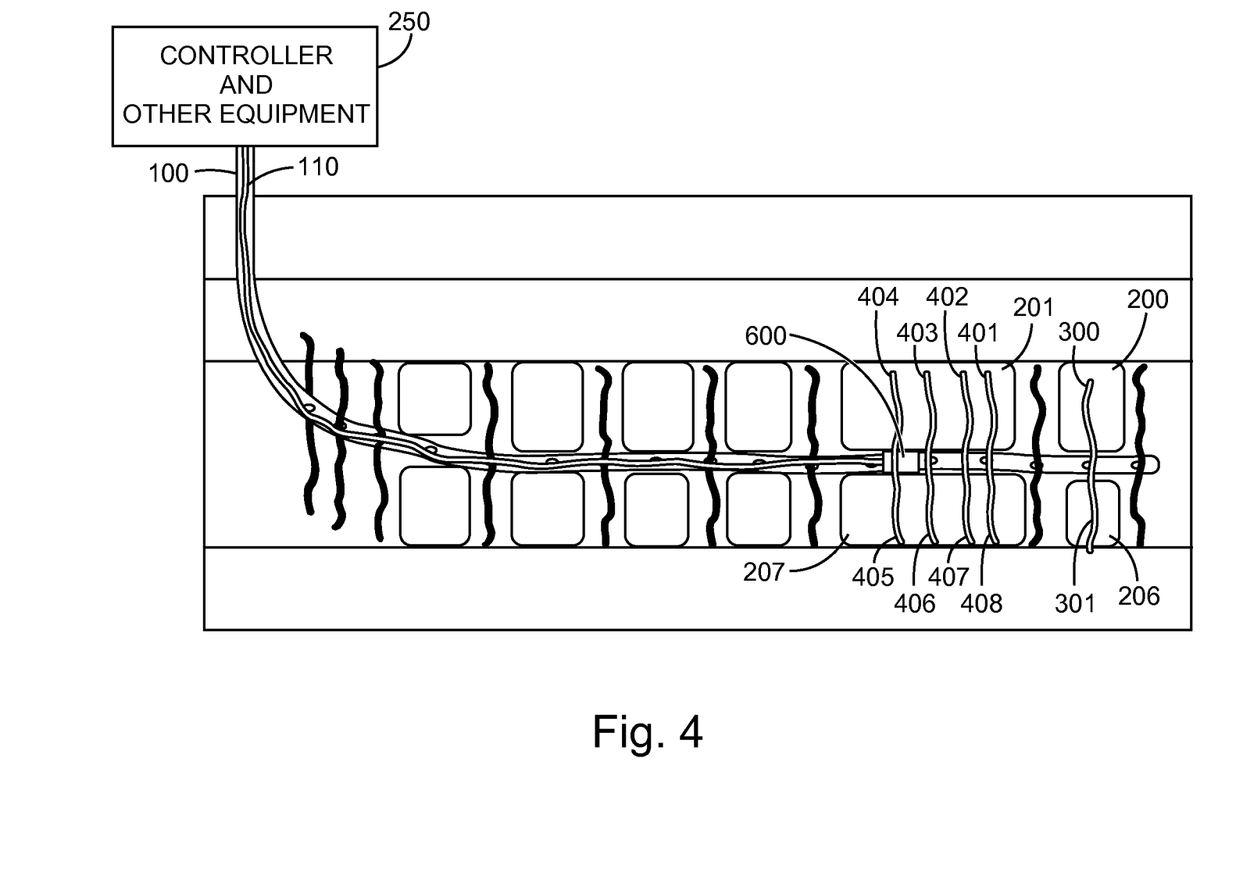

FIG. 4 is a diagram of another step of the coiled tubing operation in the wellbore, according to various aspects of the disclosure. This figure shows that the BHA 600 is moved further within the wellbore to reposition it in the next selected location (e.g., low or non-producing zone) as indicated by the differences between the current production results and the initial well production results. The next selected location is near the next low or non-producing zone 201, 207. While at this zone 201, 207, the hydrajet tool apparatus 614 is activated in order to selectively re-fracture 401-408 the zones 201, 207.

Figure 5:
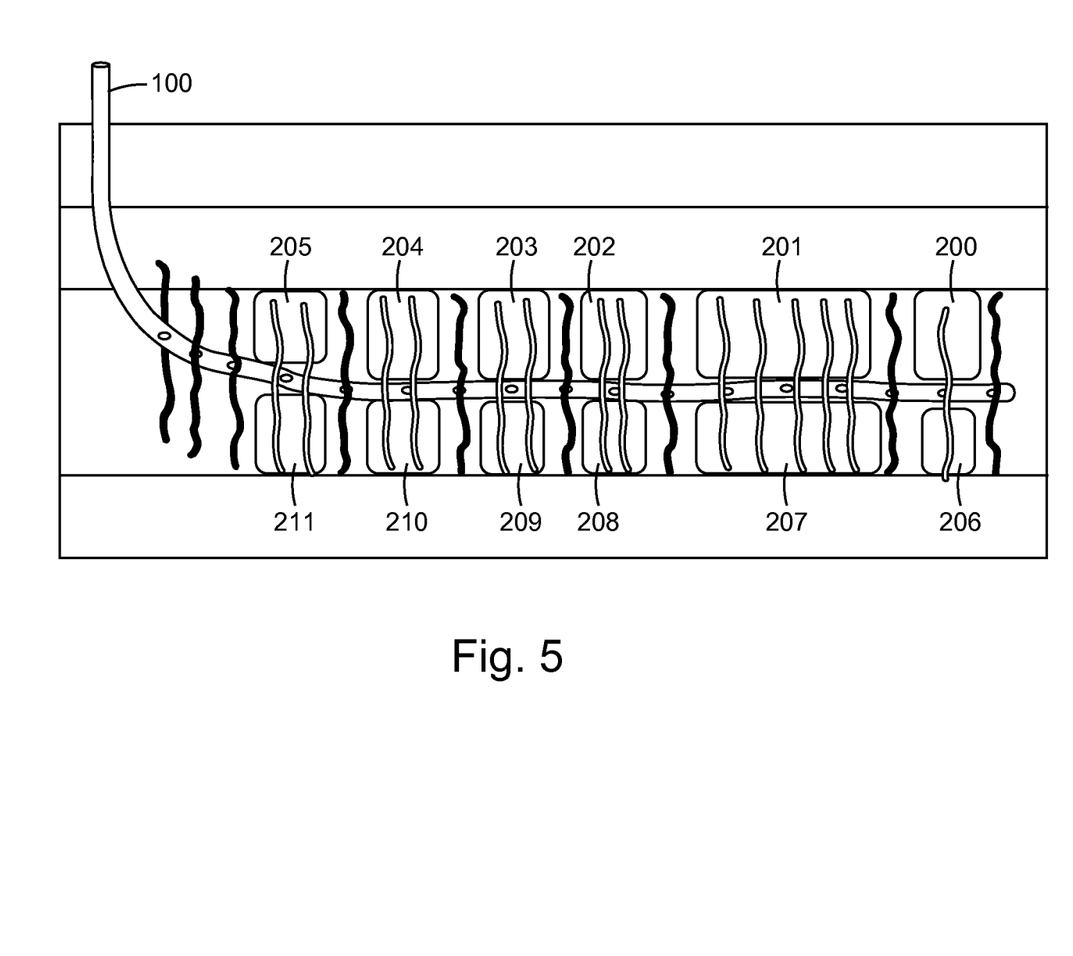

FIG. 5 is a diagram of another step of the coiled tubing operation in the wellbore, according to various aspects of the disclosure. This figure illustrates the coiled tubing with integral distributed sensor array has been removed from the wellbore. The targeted low or non-producing zones 200-211 have been selectively re-fractured by the hydrajet tool apparatus 614 of the BHA 600.

Once the target zones 200-211 have been selectively re-fractured (i.e., stimulated), the coiled tubing may be used to clean out proppant remaining in the wellbore from the re-fracturing process. In another example, the coiled tubing may be left in place during the flow-back of the well in order to monitor the performance of the newly treated intervals using the distributed sensor array of the coiled tubing.

FIG. 6 is a cross-sectional diagram showing the BHA 600, according to various aspects of the disclosure. The BHA 600 of FIG. 6 is for purposes of illustration only as any tool capable of performing the functions of borehole pressure monitoring and selective fracturing of subterranean formations in selected locations may be used.

The BHA 600 is shown comprising a hydrajet tool apparatus 614, a pressure gauge apparatus 650, and a ball-activated check valve apparatus 616. The BHA 600 may also include a temperature gauge (not shown). The BHA 600 is shown coupled to the coiled tubing 100.

The pressure gauge apparatus 650 is shown connected, through a threaded connection, to the coiled tubing 100. The pressure gauge apparatus 650 comprises one or more pressure gauges 690, 691. In another example, the functions of the pressure gauge apparatus 650 may be combined into the hydrajet tool apparatus 614 of other parts of the BHA 600. For example, the pressure gauges 690, 691 may be part of the hydrajet tool apparatus 614.

The assembly 600 may include the ball-activated check valve member 616 that is coupled to an end of the hydrajet tool apparatus 614 that is opposite from the coiled tubing 100. The BHA 600 further includes an axial fluid flow passageway extending through the entire assembly 600. An axial passageway 625 through the coiled tubing 100, an axial passageway 660 through the pressure gauge apparatus 650, and axial passageway 618 through the hydrajet tool apparatus 614, and an axial passageway 626 through the ball-activated check valve apparatus 616 are coupled together to form an axial passageway through the BHA 600. Thus, a fluid flowing from the surface through the coiled tubing may transit the BHA 600 through the axial passageway.

The hydrajet tool apparatus 614 includes angularly spaced lateral ports 619-621 disposed through the sides of the tool 614. A fluid jet forming nozzle 640-642 is connected within each of the ports 619-621. In an example, the fluid jet forming nozzles 640-642 are disposed in a single plane that is positioned at a predetermined orientation with respect to the longitudinal axis of the apparatus 614. In an example, such an orientation of the plane of the nozzles 640-642 coincides with the orientation of the plane of maximum principal stress in the formation to be fractured relative to the longitudinal axis of the well bore penetrating the formation. Other examples may use other orientations.

The hydrajet tool apparatus 614 is shown for illustration purposes only. Other selective fracturing apparatuses may be used that are capable of fracturing focused (e.g., relatively narrow stream of fluid), relatively limited areas (e.g., targeted zones) of a formation.

The axial passageway 626 of the ball-activated check valve apparatus 616 includes a relatively smaller diameter longitudinal bore 624 through an exterior end portion of the valve apparatus 616 and a larger diameter longitudinal bore 628 through a forward portion of the valve apparatus 616. A forward portion of the valve apparatus 616 is coupled to the tool apparatus 614.

The axial passageway 626 includes an annular seating surface 629 in the valve apparatus 616 for receiving the ball 630. Prior to when the ball 630 is dropped into the tubular check valve apparatus 616, fluid may freely flow through the hydrajet tool apparatus 614 and the check valve apparatus 616. After the ball 630 is seated on the seating surface 629 in the check valve apparatus 616, fluid flow through the check valve apparatus 616 is terminated which causes all of the fluid pumped into the coiled tubing 100 and into the hydrajet tool apparatus 614 to exit the hydrajet tool apparatus 614 by way of the fluid jet forming nozzles 640-642, thus selectively fracturing the subterranean formation as discussed previously. When it is desired to reverse circulate fluids through the check valve apparatus 616, the hydrajet tool 614 and the working string, the fluid pressure exerted within the coiled tubing 100 is reduced whereby high pressure fluid surrounding the hydrajet tool apparatus 614 and check valve apparatus 616 freely flows through the check valve apparatus 616, causing the ball 630 to be pushed out of engagement with the seat 629, and through the nozzles 640-642 into and through the coiled tubing 100.

Figure 7:
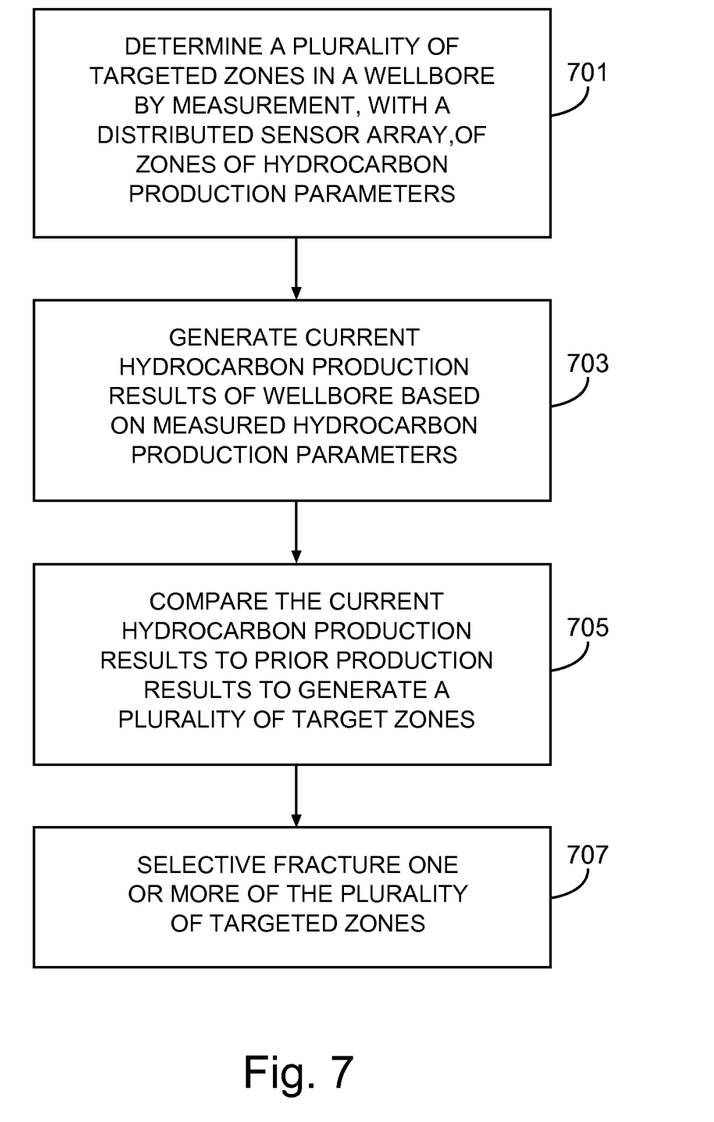
FIG. 7 is a flowchart showing a method for selective stimulation of reservoir targets, according to various aspects of the disclosure.

FIG. 7 is a flowchart showing a method for selective stimulation of reservoir targets, according to various aspects of the disclosure. This method may be executed as instructions by the controller 250 (i.e., processing unit) of the coiled tubing system.

In block 701, a plurality of targeted zones in the wellbore are determined by measurement, with the distributed sensor array, of zones of hydrocarbon production parameters. In the case of a distributed fiber optic sensor, the controller determines the hydrocarbon production parameters based on a phase difference between an interrogation beam, from the distributed fiber optic sensor array, and a reference beam. In block 703, current hydrocarbon production results of the wellbore are generated based on the zones of hydrocarbon production parameters.

In block 705, the current hydrocarbon production results are compared to prior hydrocarbon production results to generate the plurality of targeted zones. In block 707, one or more of the plurality of targeted zones are selectively fractured.

FIG. 8 is a block diagram of an example system 800 operable to implement the activities of multiple methods, according to various examples of the disclosure. The system 800 may include a tool housing 806 including the BHA tool 600 such as that illustrated in FIG. 6. The system 800 of FIG. 8 may be implemented as shown in FIGS. 2-4 with reference to the controller and other equipment 250.

The system 800 may include circuitry such as a controller 820, a memory 830, and a communications unit 835. The memory 830 may be structured to include logging data of previous well production. The controller 820, the memory 830, and the communications unit 835 may be arranged to operate as a processing unit to control operation of the selective stimulation of reservoir targets and execute any methods disclosed herein.

For example, the processing unit may perform the measurements of the measured hydrocarbon production parameters from the distributed sensor array. The processing unit may further compare these measurements to prior logging data from prior well production. The processing unit may further control operation of the coiled tubing operation by controlling movement of the coiled tubing and, thus, the BHA 600 through the wellbore to selected target locations for re-fracturing.

The communications unit 835 may include down hole communications for appropriately located sensors in a wellbore. Such down hole communications can include a telemetry system. The communications unit 835 may use combinations of wired communication technologies and wireless technologies at frequencies that do not interfere with ongoing measurements.

The system 800 may also include a bus 837, where the bus 837 provides electrical conductivity among the components of the system 800. The bus 837 can include an address bus, a data bus, and a control bus, each independently configured or in an integrated format. The bus 837 may be realized using a number of different communication mediums that allows for the distribution of components of the system 800. The bus 837 may include a network. Use of the bus 837 may be regulated by the controller 820.

The system 800 may include display unit(s) 860 as a distributed component on the surface of a wellbore, which may be used with instructions stored in the memory 830 to implement a user interface to monitor the operation of the tool 806, the distributed sensor array 110, or other components distributed within the system 800. Such a user interface may be operated in conjunction with the communications unit 835 and the bus 837. Many examples may thus be realized. A few examples of such examples will now be described.

Example 1 is a system comprising: a coiled tubing; a distributed sensor array disposed within the coiled tubing, the distributed sensor array to measure hydrocarbon production parameters along the distributed sensor array; a selective fracturing apparatus coupled to the coiled tubing, the selective fracturing apparatus to fracture selected areas of a formation; and a controller, coupled to the distributed sensor array, to control operation of the selective fracturing apparatus based on the measured hydrocarbon production parameters.

In Example 2, the subject matter of Example 1 can further include wherein the distributed sensor array comprises a distributed fiber optic sensor array.

In Example 3, the subject matter of Examples 1-2 can further include wherein the controller is to determine the hydrocarbon production parameters based on a phase difference between an interrogation beam from the distributed fiber optic sensor array and a reference beam.

In Example 4, the subject matter of Examples 1-3 can further include wherein the hydrocarbon production parameters comprise temperature, acoustic signatures, and/or bottom hole pressures in a borehole in the formation.

In Example 5, the subject matter of Examples 1-4 can further include wherein the selective fracturing apparatus is a hydrajet tool apparatus.

In Example 6, the subject matter of Examples 1-5 can further include wherein the selective fracturing apparatus is part of a bottom hole assembly.

In Example 7, the subject matter of Examples 1-6 can further include wherein the bottom hole assembly further comprises a pressure gauge apparatus and a ball-activated check valve.

In Example 8, the subject matter of Examples 1-7 can further include wherein the controller is to determine target zones in the formation based on a difference between current hydrocarbon production results and prior hydrocarbon production results.

In Example 9, the subject matter of Examples 1-8 can further include wherein the controller is to determine the current hydrocarbon production results by monitoring zones of hydrocarbon production parameters.

Example 10 is a method comprising: determining a plurality of targeted zones in a wellbore by measurement, with a distributed sensor array, of zones of hydrocarbon production parameters; and selectively fracturing one or more of the plurality of targeted zones based on the hydrocarbon production parameters.

In Example 11, the subject matter of Example 10 can further include: generating current hydrocarbon production results of the wellbore based on the zones of hydrocarbon production parameters; and comparing the current hydrocarbon production results to prior hydrocarbon production results to generate the plurality of targeted zones.

In Example 12, the subject matter of Examples 10-11 can further include wherein the one or more of the plurality of targeted zones is fractured individually.

In Example 13, the subject matter of Examples 10-12 can further include inserting a coiled tubing, comprising the distributed sensor array, into the wellbore.

In Example 14, the subject matter of Examples 10-13 can further include: inserting the coiled tubing, coupled to a bottom hole assembly, such that the bottom hole assembly is in an initial position located near a toe of the well; maintaining the bottom hole assembly in the initial position while the well produces hydrocarbons; determining production results based on temperature, acoustic signature, and/or bottom hole pressures while the well produces; comparing the production results with prior production results to determine the plurality of targeted zones; and selectively moving the bottom hole assembly to the plurality of targeted zones for selectively fracturing one or more of the plurality of targeted zones.

In Example 15, the subject matter of Examples 10-14 can further include maintaining a positive pressure in an annulus between the coiled tubing and sides of the well.

In Example 16, the subject matter of Examples 10-15 can further include maintaining the coiled tubing in the well to monitor performance of the well with the distributed sensor array.

Example 17 is an apparatus comprising: a distributed sensor array integral to coiled tubing, the distributed sensor array to measure hydrocarbon production parameters of a plurality of zones of a well; a selective fracturing apparatus coupled to the coiled tubing; and a controller coupled to the distributed sensor array and the selective fracturing apparatus to control selective fracturing of target zones of the well, with the selective fracturing apparatus, based on a difference between the measured hydrocarbon production parameters and prior hydrocarbon production parameters of the plurality of zones.

In Example 18, the subject matter of Example 17 can further include wherein the selective fracturing apparatus is disposed in a bottom hole device comprising a ball-activated check valve.

In Example 19, the subject matter of Examples 17-18 can further include wherein the ball-activated check valve is to cause a fluid to exit forming nozzles of the selective fracturing apparatus responsive to a ball seated in a seating surface of the ball-activated check valve.

In Example 20, the subject matter of Examples 17-19 can further include wherein the selective fracturing apparatus comprises angularly spaced lateral ports disposed through sides of the apparatus.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A system for use in a wellbore through a formation containing hydrocarbons, comprising:
    a coiled tubing;
    a distributed sensor array disposed within and integral with the coiled tubing, the distributed sensor array configured to measure hydrocarbon production parameters along the distributed sensor array;
    a selective fracturing apparatus coupled to the coiled tubing, the selective fracturing apparatus to fracture selected areas of the formation; and
    a controller, coupled to the distributed sensor array, operable to identify the selected areas for fracturing and control operation of the selective fracturing apparatus based on the measured hydrocarbon production parameters.

2. The system of claim 1, wherein the distributed sensor array comprises a distributed fiber optic sensor array.

3. The system of claim 2, wherein the controller is to determine the hydrocarbon production parameters based on a phase difference between an interrogation beam from the distributed fiber optic sensor array and a reference beam.

4. The system of claim 3, wherein the hydrocarbon production parameters comprise at least one of temperature, acoustic signatures, or bottom hole pressures in the wellbore in the formation.

5. The system of claim 1, wherein the selective fracturing apparatus is a hydrajet tool apparatus.

6. The system of claim 1, wherein the selective fracturing apparatus is part of a bottom hole assembly.

7. The system of claim 6, wherein the bottom hole assembly further comprises a pressure gauge apparatus and a ball-activated check valve.

8. The system of claim 1, wherein the controller is operable to identify the selected areas of the formation based on a difference between current hydrocarbon production results and prior hydrocarbon production results.

9. The system of claim 8, wherein the controller is operable to determine the current hydrocarbon production results by monitoring zones of hydrocarbon production parameters.

10. A method comprising:
    inserting a coiled tubing, comprising an integral distributed sensor array within the coiled tubing, into a wellbore;
    determining a plurality of targeted zones in the wellbore by measurement, with the distributed sensor array, of zones of hydrocarbon production parameters; and
    with the coiled tubing remaining in the wellbore, selectively fracturing one or more of the plurality of targeted zones based on the hydrocarbon production parameters.

11. The method of claim 10, further comprising:
generating current hydrocarbon production results of the wellbore based on the zones of hydrocarbon production parameters; and
comparing the current hydrocarbon production results to prior hydrocarbon production results to generate the plurality of targeted zones.

12. The method of claim 10, wherein the one or more of the plurality of targeted zones is fractured individually.

13. The method of claim 10, further comprising:
inserting the coiled tubing, coupled to a bottom hole assembly, such that the bottom hole assembly is in an initial position located near a toe of the well;
maintaining the bottom hole assembly in the initial position while the well produces hydrocarbons;
determining production results based on temperature, acoustic signature, and/or bottom hole pressures while the well produces;
comparing the production results with prior production results to determine the plurality of targeted zones; and
selectively moving the bottom hole assembly to the plurality of targeted zones for selectively fracturing one or more of the plurality of targeted zones.

14. The method of claim 13, further comprising maintaining a positive pressure in an annulus between the coiled tubing and sides of the well.

15. The method of claim 14, further comprising maintaining the coiled tubing in the well to monitor performance of the well with the distributed sensor array.

16. An apparatus for use in a well, comprising:
a distributed sensor array integral to a coiled tubing, the distributed sensor array configured to measure hydrocarbon production parameters of a plurality of zones of the well;
a selective fracturing apparatus coupled to the coiled tubing; and
a controller coupled to the distributed sensor array and the selective fracturing apparatus and operable to identify target zones of the well and to control selective fracturing of the target zones with the selective fracturing apparatus based on a difference between the measured hydrocarbon production parameters and prior hydrocarbon production parameters of the plurality of zones.

17. The apparatus of claim 16, wherein the selective fracturing apparatus is disposed in a bottom hole device comprising a ball-activated check valve.

18. The apparatus of claim 17, wherein the ball-activated check valve is to operable cause a fluid to exit forming nozzles of the selective fracturing apparatus responsive to a ball seated in a seating surface of the ball-activated check valve.

19. The apparatus of claim 16, wherein the selective fracturing apparatus comprises angularly spaced lateral ports disposed through sides of the apparatus.

\* \* \* \* \*